United States Patent
Hoshino et al.

(10) Patent No.: US 8,915,437 B2
(45) Date of Patent: *Dec. 23, 2014

(54) IDENTIFICATION MEDIUM, METHOD FOR READING DATA THEREFROM, APPARATUS FOR IDENTIFICATION, AND METHOD AND APPARATUS FOR PRODUCTION THEREOF

(75) Inventors: Hidekazu Hoshino, Yokohama (JP); Itsuo Takeuchi, Yokohama (JP); Tokio Sakauchi, Yokohama (JP); Tohru Ida, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/807,182

(22) PCT Filed: Jun. 29, 2011

(86) PCT No.: PCT/JP2011/064924
§ 371 (c)(1),
(2), (4) Date: Dec. 27, 2012

(87) PCT Pub. No.: WO2012/002441
PCT Pub. Date: Jan. 5, 2012

(65) Prior Publication Data
US 2013/0099000 A1    Apr. 25, 2013

(30) Foreign Application Priority Data

Jul. 2, 2010  (JP) .................................. 2010-152321
Nov. 8, 2010  (JP) .................................. 2010-249422

(51) Int. Cl.
*G06K 7/10*  (2006.01)
(Continued)

(52) U.S. Cl.
CPC ........ *G06K 19/06065* (2013.01); *G02B 5/3041* (2013.01); *G03H 1/0252* (2013.01);
(Continued)

(58) Field of Classification Search
CPC ... G03H 2250/40; G03H 1/00; G03H 1/0011; G03H 1/0252; G03H 1/0005; G03H 1/0272; G03H 1/04; G03H 1/02; G06K 19/06065; B42D 2035/00; B42D 2035/20; B42D 2035/22; B42D 15/10; B42D 15/105
USPC .......... 235/375, 380, 451, 457, 488, 492, 494
See application file for complete search history.

(56) References Cited

U.S. PATENT DOCUMENTS 6,827,373 B2 * 12/2004 Zumberge ........................ 283/81
7,215,451 B1 *  5/2007 Nishikawa et al. ............. 359/12
(Continued)

FOREIGN PATENT DOCUMENTS

JP   A-2008-268776   11/2008
JP   A-2009-172798    8/2009

OTHER PUBLICATIONS

International Search Report issued in International Patent Application No. PCT/JP2011/064924 mailed Oct. 11, 2011.

*Primary Examiner* — Tuyen K Vo
(74) *Attorney, Agent, or Firm* — Oliff PLC

(57) ABSTRACT

A technique detects counterfeit products having appearances similar to authentic products with high accuracy. A cholesteric liquid crystal layer in which hologram is processed and circularly polarized light of primary rotating direction having specific central wavelength can be selectively reflected and a code forming layer in which code printed pattern that is an objective of reading is formed, are arranged in this order seen from a side from which reading is performed. The hologram image that inhibits reading of information of the code while an optical reading device reads it together with the code, and it is formed by the hologram processing.

9 Claims, 10 Drawing Sheets

(51) Int. Cl.
- *G06K 7/08* (2006.01)
- *G06K 19/06* (2006.01)
- *G02B 5/30* (2006.01)
- *G03H 1/02* (2006.01)
- *G03H 1/00* (2006.01)
- *B42D 25/00* (2014.01)
- *B32B 38/00* (2006.01)
- *G02B 27/28* (2006.01)
- *G03H 1/22* (2006.01)

(52) U.S. Cl.
CPC ..... *G02B 5/3016* (2013.01); *G03H 2001/2276* (2013.01); *G03H 1/0011* (2013.01); *B42D 15/10* (2013.01); *G03H 2250/40* (2013.01); *G06K 7/10* (2013.01); *B32B 38/145* (2013.01); *G03H 2250/38* (2013.01); *G03H 1/02* (2013.01); *G03H 1/0256* (2013.01); *G02B 27/286* (2013.01); *G03H 2250/41* (2013.01)

USPC ...... 235/457; 235/380; 235/451; 235/462.34; 235/492; 235/494

(56) References Cited

U.S. PATENT DOCUMENTS

| | | | |
|---|---|---|---|
| 8,421,987 B2* | 4/2013 | Hoshino et al. | 349/176 |
| 2001/0053004 A1* | 12/2001 | Nishikawa et al. | 359/15 |
| 2002/0001109 A1* | 1/2002 | Hamano et al. | 359/9 |
| 2002/0051264 A1* | 5/2002 | Shiozawa et al. | 359/2 |
| 2004/0129788 A1* | 7/2004 | Takahashi et al. | 235/492 |
| 2008/0090029 A1* | 4/2008 | Hoshino et al. | 428/29 |
| 2008/0138543 A1* | 6/2008 | Hoshino et al. | 428/29 |
| 2009/0128772 A1* | 5/2009 | Hoshino et al. | 349/193 |
| 2010/0302486 A1 | 12/2010 | Hoshino et al. | |

* cited by examiner

Left circularly polarized light filter

Right circularly polarized light filter

Direct view

IDENTIFICATION MEDIUM, METHOD FOR READING DATA THEREFROM, APPARATUS FOR IDENTIFICATION, AND METHOD AND APPARATUS FOR PRODUCTION THEREOF

TECHNICAL FIELD

The present invention relates to identification media, including one-dimensional and two-dimensional codes (barcodes and Quick Response Codes, also called matrix codes), which are used for identification, a method for reading data, an apparatus for identification, and a method for production of the identification medium.

BACKGROUND ART

Techniques for controlling parts or items of food using one-dimensional or two-dimensional codes (barcodes and Quick Response Codes, also called matrix codes, hereinafter referred to as codes) are known. By using such codes, types of information about an object such as information of the producer, records (records of logistics processes, for example), authenticity (decision of whether it is counterfeit or not), date of production, and the like can be obtained. Furthermore, techniques in which codes are read electronically and sent so as to apply kinds of services or to obtain information are known. As a technique to prevent counterfeiting of the code, techniques in which a hologram is used are known (See Patent Reference 1).

Patent Reference 1: Japanese Unexamined Patent Application Publication No. 2008-268776.

SUMMARY OF THE INVENTION

Patent Reference 1 discloses a technique that makes it difficult to perform visual contact of information of a code embedded by conventional observation without losing the hologram effect. On the other hand, a technique has been required in which reading of a counterfeit having similar visual appearance to an authentic article is restricted during electronic reading by a reader. As such a technique, a method of complicating a code, a method in which special ink or a watermark technique is used, and the like are known. However, effects of preventing counterfeiting are reduced in the case in which details of these techniques are known and used. Furthermore, in the case in which the codes are made complicated or a watermark technique is used, there is a problem of maintaining accuracy of electronically reading the codes.

In view of such circumstances, an object of the present invention is to provide a technique in which a counterfeit having similar visual appearance can be easily detected and in which accuracy of reading codes is high.

The invention according to claim 1 is an identification medium characterized in that the medium has a cholesteric liquid crystal layer in which a hologram is processed and circularly polarized light of a primary rotating direction is selectively reflected, and a code forming layer in which an objective code which is to be read is formed, in this order, seen from the side at which reading is performed, and that a hologram image inhibiting reading of information of the code when an optical reading device reads the code with it at the same time, is formed by the hologram processing.

By the invention of claim 1, in the case in which data in the identification medium is read by an optical reading device (for example, a barcode reader) not via a circularly polarized light filter, the optical reading device will detect a code image (for example, a two-dimensional barcode) in the code layer and the hologram image in the cholesteric liquid crystal layer at the same time. At this time, since reading of the code image is inhibited by the hologram image, reading of the data cannot be completed merely by performing direct optical reading by the optical reading device.

On the other hand, in the case in which reading is performed by the optical reading device via a circularly polarized light filter which blocks circularly polarized light in a rotating direction in which the cholesteric liquid crystal layer selectively reflects, since the reflect light from the cholesteric liquid crystal layer is blocked by the circularly polarized light filter, the optical reading device will not detect the hologram image in the cholesteric liquid crystal layer. Therefore, S/N for detecting information of the code in the code-forming layer is increased, and thus detecting and decoding of the code become possible. That is, selective reading of the code is possible.

The reflect light of the cholesteric liquid crystal layer is a circularly polarized light of rotating direction of left or right, and blocking property (a property not being penetrated) in the case in which the reflect light is blocked by the circularly polarized light filter is extremely high. In addition, since the light is circularly polarized light, a property which blocks circularly polarized light of a rotating direction opposite to this is not varied even if the circularly polarized light filter is rotated. Therefore, a function of inhibiting reading of the code in the code forming layer by the hologram image of the cholesteric liquid crystal layer in the case not using the circularly polarized light filter and an effect of maintaining S/N of detection while optically detecting the code information of the code forming layer by blocking the reflect light from the cholesteric liquid crystal layer with the circularly polarized light filter, can be both obtained.

In addition, since know-how is necessary to perform hologram processing of the cholesteric liquid crystal layer, the hologram cannot be made to reappear easily even if one knows the content of the hologram image. Furthermore, since the cholesteric liquid crystal layer has an optical property in which a specific central wavelength is selectively reflected, it is not easy to perform contact copy of hologram interference structures (embossed structure forming a hologram) in which photosensitive material is used, that is, it resistant to counterfeiting in which the hologram type is difficult to be made to reappear. This is caused by the fact that a contact copy cannot have reproducibility of coloration of the hologram image and detailed image information without using a photosensitive material having the same photosensitive property as a spectrum of reflect light selectively reflected from the cholesteric liquid crystal layer.

The present invention can provide an identification medium in which the effect of the hologram image is removed to enable reading code by optical detecting of code via the circularly polarized light filter which selectively allows penetrating of circularly polarized light of opposite rotation direction to circularly polarized light selectively reflected by the cholesteric liquid crystal used, although the code cannot be observed apparently by the naked eye because it is inhibited by the hologram image.

Furthermore, effects of preventing counterfeiting as explained below can be obtained by the present invention. First, since it is difficult to counterfeit the hologram of the cholesteric liquid crystal layer even if the code can be counterfeited, it becomes difficult to produce (counterfeit) one that is completely the same although it is one that is the same in appearance. Furthermore, even in the case in which an ordinary hologram, not the hologram of the cholesteric liquid crystal, is layered on the code to counterfeit a product having the same appearance with high accuracy, the counterfeit can be easily detected because a virtual effect in which only the code can be brightly seen or a negative image hologram can be brightly seen while the image of the code is decreased, cannot be obtained by observation via the circularly polarized light filter.

It should be noted that the reading type of the optical reading device is not limited as long as it reads code optically, for example, a type which obtains images by an image pickup device such as a CCD, a type which detects directly reflect light or scattered reflect light by an optical light-receiving sensor, a type which detects pattern of reflect light by light-receiving sensor array or the like can be employed.

The identification medium according to claim 2 is characterized in that, in the invention of claim 1, an optical function layer in which circularly polarized light of a secondary rotating direction opposite to the primary rotating direction is selectively penetrated toward the cholesteric liquid crystal layer in the case in which natural light enters from the opposite side to the cholesteric liquid crystal layer side, is arranged between the cholesteric liquid crystal layer and the code forming layer.

By the invention of claim 2, reflected light from the code-forming layer penetrates through the optical function layer and then enters from a not-observed side (a side opposite to a side on which optical reading is performed) of the cholesteric liquid crystal layer. This incident light becomes circularly polarized light of a secondary rotating direction opposite to the rotating direction of circularly polarized light selectively reflected by the cholesteric liquid crystal layer (the primary rotating direction) by the function of the optical function layer. Therefore, in the case in which the identification medium is observed via the circularly polarized light filter which selectively allows penetrating of circularly polarized light of the first rotating direction, since the circularly polarized light of a secondary rotating direction is blocked by this circularly polarized light filter, the code cannot be seen and the hologram image from the cholesteric liquid crystal layer can be brightly seen. Therefore, identification characteristics by the naked eye using a hologram image are increased. The same result can be obtained in the case in which an optical reading device is used, and identification characteristics by detecting a hologram image is increased.

When a case in which the optical function layer of claim 2 is not arranged is assumed, in an observation via the circularly polarized light filter which selectively allows penetrating light of the primary rotating direction, a circularly polarized light component of the primary rotating direction among random light components reflected from the code forming layer may penetrate the circularly polarized light filter being mixed with reflect light from the cholesteric liquid crystal layer. Therefore, the hologram image cannot be brightly seen alone, and the code is visible at the same time. The same result can be obtained in the case in which an optical reading device is used. Therefore, visibility of hologram image alone in the cholesteric liquid crystal layer and reading accuracy by the image reading device may be deteriorated.

The invention according to claim 3 is characterized in that, in the invention of claim 1 or 2, the code is constructed by one or more selected from barcodes, two-dimensional codes, OCR codes, hologram codes or color codes. As such a code, various types and standards of code have been disclosed or suggested, and in the present invention, any type or standard codes can be used. Here, the OCR code is a code displayed by characters, and the color code is a code constructed by combination of a plurality of colors. These codes can be used by combining multiple kinds. As a method to read the code, a method in which contrasting of reflect light is detected as a digital signal by corresponding to 0 and 1 (Hi condition and Low condition), or a method in which pattern of the code is read as an image by using an image pickup device like reading of two-dimensional barcode using a camera function of a cellular phone and the code is decoded by image processing depending on the image, can be mentioned.

The invention according to claim 4 is characterized in that, in the invention of claim 3, the code has a size which is difficult to recognize by the naked eye. In the invention of claim 4, by making the codes such as barcodes, two-dimensional codes, OCR codes, hologram codes, color codes or the like to have a size which is difficult to recognize by the naked eye, and by enlarging with an augmented optical system, reading of the code can be performed. By such a construction, the hologram image of the cholesteric liquid layer is seen dominantly when viewed straight, and thus the identification medium of which the code is difficult to be seen by the naked eye can be provided.

The invention according to claim 5 is characterized in that, in the invention of one of claims 1 to 4, the hologram image constructs another code to the code formed in the code forming layer. By the invention of claim 5, since the code (hologram code) of which the hologram image of the cholesteric liquid crystal layer is used is also used in addition to the code formed in the code-forming layer, the data amount handled can be increased by the combination thereof. Furthermore, improved identification characteristics can be obtained by a combination of reading of one kind of data alone and reading of both kinds of data.

Furthermore, in the case in which the invention of claim 2 is employed, reflected light from the code forming layer and reflected light from the cholesteric liquid crystal layer can be separately detected by the right circularly polarized light filter and the left circularly polarized light filter. Therefore, by using the primary circularly polarized light filter, reflected light from the cholesteric liquid crystal layer can be selectively detected, thereby enabling reading of the hologram code selectively. Furthermore, by using the secondary circularly polarized light filter, reflected light from the code forming layer can be selectively detected, thereby enabling reading the code information of the code forming layer selectively.

The invention according to claim 6 is a method for reading data from an identification medium having a cholesteric liquid crystal layer in which a hologram is processed and circularly polarized light of the primary rotating direction is selectively reflected, and a code forming layer in which an objective code which is to be read is formed, in this order, seen from a side reading is performed, wherein a hologram image inhibiting reading of information of the code while an optical reading device reads the code with it at the same time, is formed by the hologram processing, the method for reading data is characterized in that the method includes a step of reading the code selectively by an optical reading device, via a circularly polarized light filter which blocks the circularly polarized light of the primary rotating direction.

By the invention according to claim 6, a method for reading data can be provided, in which the code cannot be read in the case it is not via the circularly polarized light filter blocking the circularly polarized light of the primary rotating direction, and the data can be read via the circularly polarized light filter blocking the circularly polarized light of the primary rotating direction. That is, since the hologram image of the cholesteric liquid crystal layer and the code are seen at the same time unless the circularly polarized light filter is used, reading of the code can be inhibited. Furthermore, since only reflected light from the cholesteric liquid crystal layer can be seen in the case in which the identification medium is observed via the circularly polarized light filter allowing penetrating circularly polarized light of the primary rotating direction, the code cannot be read also in this case. In this way, the present invention provides a technique in which the code cannot be read without using the circularly polarized light filter that allows penetrating of light of a specific rotating direction.

The invention according to claim 7 is characterized in that, in the invention of claim 6, the optical reading device reads the hologram in the cholesteric liquid crystal layer and the code simultaneously, and whether it is authentic or counterfeit is decided depending on the selective reading of the code and the simultaneous reading of the hologram and the code.

The invention according to claim 8 is an apparatus for identification, the apparatus deciding the identification medium according to one of claims 1 to 5 being whether it is authentic or counterfeit, and the invention is characterized in that the apparatus includes a reading means which selectively reads the code via the circularly polarized light filter which blocks the circularly polarized light of the primary rotating direction.

The invention according to claim 9 is a method for production of the identification medium according to one of claims 1 to 5, the invention is characterized in that the method includes steps of: a forming process in which the code forming layer is formed by printing, and a unifying process in which the code forming layer and the cholesteric liquid crystal layer are joined.

The invention is an apparatus for production of the identification medium according to one of claims 1 to 5, the invention is characterized in that the apparatus comprises: a primary roll which rolls a primary separator on which a primary label part in which a part or the entirety of the code forming layer can be formed is pasted, a secondary roll which rolls a secondary separator on which a secondary label part including the cholesteric liquid crystal layer is pasted, a printing means which prints the code forming layer, and a pasting means which pastes the secondary label part on the code forming layer printed by the printing means.

By the invention according to claim 1, the identification medium is provided, in which a counterfeit product having similar appearance as that of an authentic one can be easily detected by the hologram of the cholesteric liquid crystal layer. Furthermore, at the same time, an identification medium is provided in which the code can be read with high accuracy without being affected by the hologram of the cholesteric liquid crystal layer by the cholesteric liquid crystal layer reflecting selectively circularly polarized light of a specific rotating direction and by intervening the circularly polarized light filter whose property of allowing penetrating of circularly polarized light of an opposite direction thereof is used.

By the invention according to claim 2, in an observation via the circularly polarized light filter, it becomes possible for the hologram of the cholesteric liquid crystal layer to be brightly observed while the code design of the code forming layer cannot be seen.

By the invention according to claim 3, an identification medium that is adapted to various code standards can be obtained.

By the invention according to claim 4, an identification medium in which code is difficult to recognize by the naked eye can be provided.

By the invention according to claim 5, an identification medium in which further more code information can be handled and further improved identifying function can be obtained, can be provided.

By the invention according to claim 6, a method for reading data from the identification medium having superiority of invention according to claim 1 can be provided.

By the invention according to claim 7, a method for reading data in which even more code information can be handled and even higher identifying function can be obtained, can be provided.

By the invention according to claim 8, an identification apparatus of the identification medium having superiority of invention of according to one of claims 1 to 5 can be provided.

By the invention according to claim 9, a method for production of the identification medium having superiority of invention according to one of claims 1 to 5 can be provided.

By the invention, an apparatus for production of the identification medium can be provided, in which the code forming layer is formed by printing and the label part of the cholesteric liquid crystal layer which gives identification property to reading of code forming layer is pasted thereon.

EXPLANATION OF REFERENCE NUMERALS

100: Identification medium, 101: Transparent protective layer, 102: Cholesteric liquid crystal layer, 103: Hologram processing, 104: $\lambda/4$ plate, 105: Linearly polarized light filter layer, 106: Circularly polarized light filter layer, 107: Code printed pattern, 108: Base material film layer, 109: Adhering layer, 300: Reading apparatus, 303: Light, 304: Circularly polarized light filter, 305: Stage, 320: Magnifying lens, 700: Identification medium, 701: Separator (release paper), 702: Two-dimensional code figure, 703: Hologram figure, 704:

Another print figure, 711: Adhering layer, 712: Base material paper, 714: Adhering layer, 715: Linearly polarized light filter layer, 716: λ/4 plate, 717: Circularly polarized light filter layer, 718: Cholesteric liquid crystal layer, 719: Transparent protective layer, 720: Paper label part, 721: Roll, 730: Hologram label part, 731: Separator, 732: Roll, 750: Apparatus for production of identification label, 751: Guide roll, 752: Guide roll, 753: Print head, 754: Pasting roller, 755: Winding roll.

BEST MODE FOR CARRYING OUT THE INVENTION (1) First Embodiment

Figure 1:
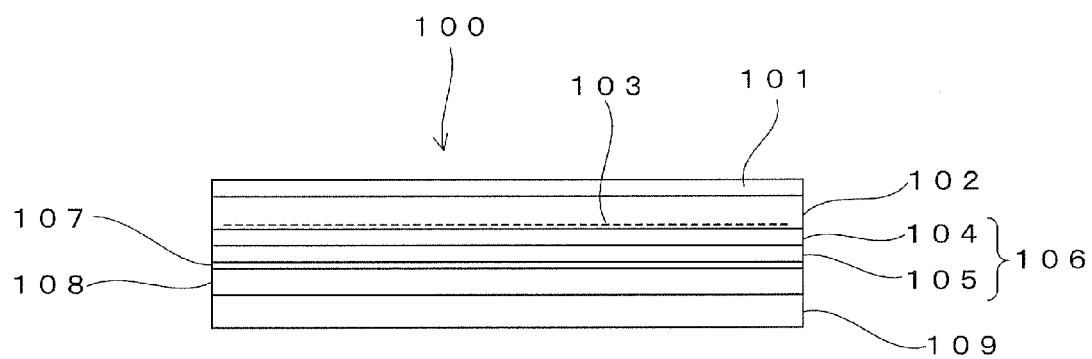
FIG. 1 is a conceptual diagram showing a cross sectional structure of the identification medium of the embodiment.

FIG. 1 shows an identification medium 100 of an embodiment. The identification medium 100 has a structure which is laminated with a transparent protective layer 101, a cholesteric liquid crystal layer 102, a λ/4 plate 104, a linearly polarized light filter layer 105, a code printed pattern 107, a base film layer 108, and an adhering layer 109, in that order, from an observing side (an identifying surface side).

The transparent protective layer 101 is a transparent resin film layer that protects the most surface. In the transparent protective layer 101, materials which do not disturb polarization properties of penetrating light, such as TAC (triacetylcellulose), etc., are selected. The cholesteric liquid crystal layer 102 has optical properties that selectively reflect red right circularly polarized light. The cholesteric liquid crystal layer 102 is subjected to a hologram processing 103 by pressing an embossing die. A relief structure is formed on the cholesteric liquid crystal layer 102 by the hologram processing 103, and a hologram image is formed by an optical interference generated by the relief structure. The hologram image can be visually recognized by observing light reflected at the cholesteric liquid crystal layer 102.

A circularly polarized light filter layer 106 is formed by two layers of the λ/4 plate 104 and the linearly polarized light filter layer 105. In the circularly polarized light filter layer 106, direction of the λ/4 plate 104 and the linearly polarized light filter layer 105 is adjusted so as to have an optical function which selectively penetrates left circularly polarized light at an observing surface side (upper side in figure) when natural light enters from the side of a code printed pattern 107 which is a non-observing surface side.

The code printed pattern 107 is a pattern of two-dimensional barcode formed by printing ink on the base film layer 108, and it forms a code-forming layer. The base film layer 108 is a resin film layer having background color that highlights contents of the printed two-dimensional barcode. The adhering layer 109 is a layer made of adhesive material. The identification medium 100 is adhered to an article by function of the adhesive layer 109. A separator (a peelable paper), which is not shown, is adhered to an exposed surface of the adhesive layer 109, and in order to adhere the identification medium 100 to the article, the identification medium 100 is adhered to the article in a condition in which the adhering layer 109 is exposed by peeling this separator. The code pattern printing 107 may be formed by printing at a linearly polarized light filter 105 side of the circularly polarized light filter 106 without the base film.

(Relationship between Hologram and Code Pattern)

The hologram image formed by the hologram processing 103 is logos or patterns that are easily recognized. This hologram image and the code pattern have a positional relationship in which at least one part is overlapped. Therefore, in the case in which hologram image and code are simultaneously detected, it is difficult to electronically read the code pattern. A hologram image of content in which code is certainly difficult to read due to effects of the hologram image may be chosen, when the hologram image is read with the code printed pattern 107 by a code reader. As a result, security can be reliably improved.

(Optical Function)

Figure 2:
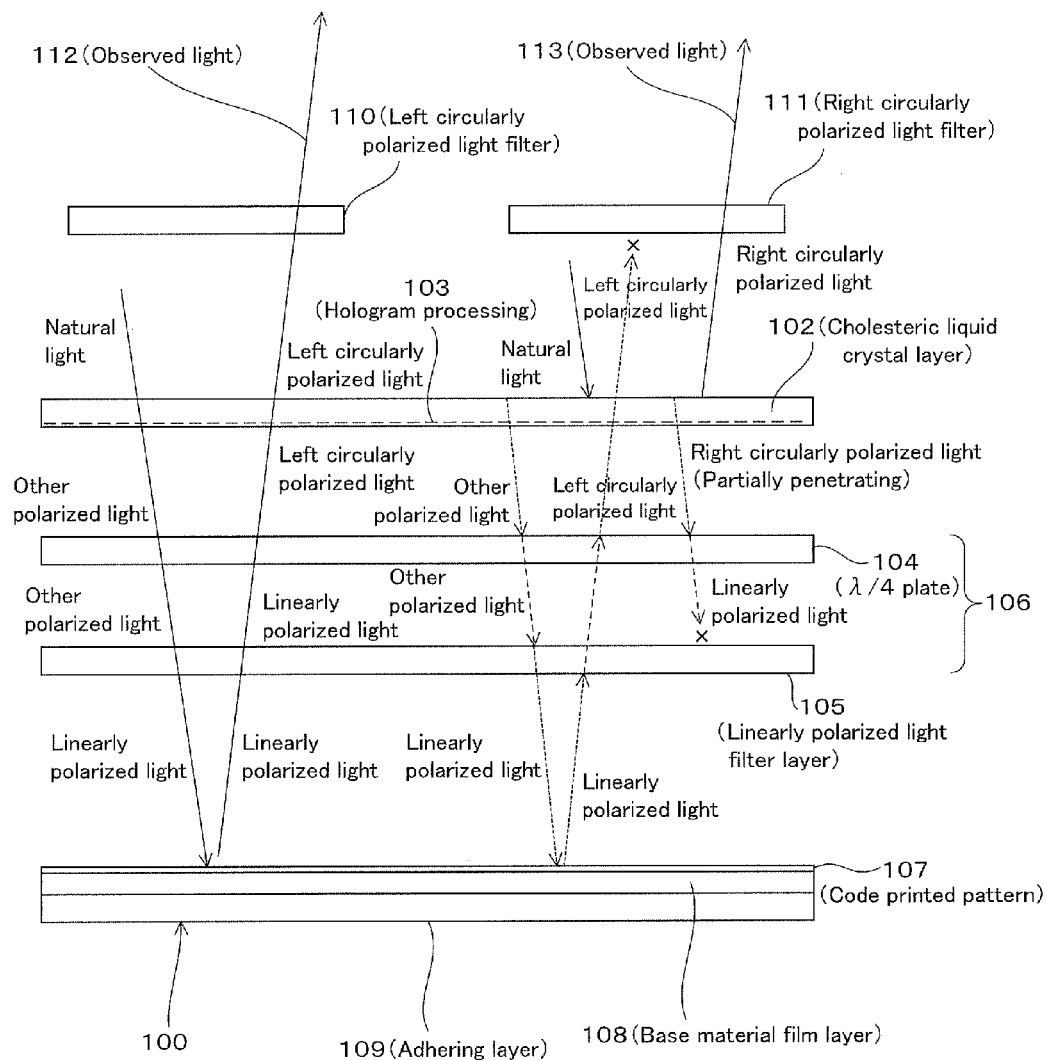
FIG. 2 is a principle diagram showing optical principles of the identification medium of the embodiment.

FIG. 2 is a conceptual diagram showing a principal of an optical function of the identification medium 100. In the following, an optical function of the identification medium 100 in an environment in which natural light enters from the side of a cholesteric liquid crystal layer 102 (upper side in figure) will be explained. A transparent protective layer 101 is omitted and not shown in FIG. 2.

First, basic optical characteristics are explained. Of natural light entered in the identification medium 100, red right circularly polarized light is reflected from the cholesteric liquid crystal layer 102. This reflected light from the cholesteric liquid crystal layer 102 is a reflected light containing the hologram image formed by the hologram processing 103.

In addition, left circularly polarized light, linearly polarized light, and right circularly polarized light except for red light which are not reflected by the cholesteric liquid crystal layer 102, pass through the cholesteric liquid crystal layer 102, and they enter the circularly polarized light filter layer 106. This incident light changes to linearly polarized light when it passes through the linearly polarized light filter layer 105 of the circularly polarized light filter layer 106 and exits to the side of the code printed pattern 107. Then it enters the code printed pattern 107 and is reflected. This reflected light from the code printed pattern 107 contains an image of two-dimensional barcode of the code printed pattern 107.

This reflected light from the code printed pattern 107 changes to left circularly polarized light (counterclockwise turning circularly polarized light) when it passes through the circularly polarized light filter layer 106 in a lower direction or an upper direction of figure. That is, the circularly polarized light filter layer 106 has property in which left circularly polarized light exits from the side of the λ/4 plate 104, in the case in which natural light enters from the side of the linearly polarized light filter layer 105. Therefore, the reflected light (linearly polarized light) from the code printed pattern 107 passes through the circularly polarized light filter layer 106 in an upper direction in figure as left circularly polarized light. Since this penetrated light is left circularly polarized light, it passes through the cholesteric liquid crystal layer 102 and exits to the side of an observing surface.

(Observation through Left Circularly Polarized Filter)

Figure 3A:
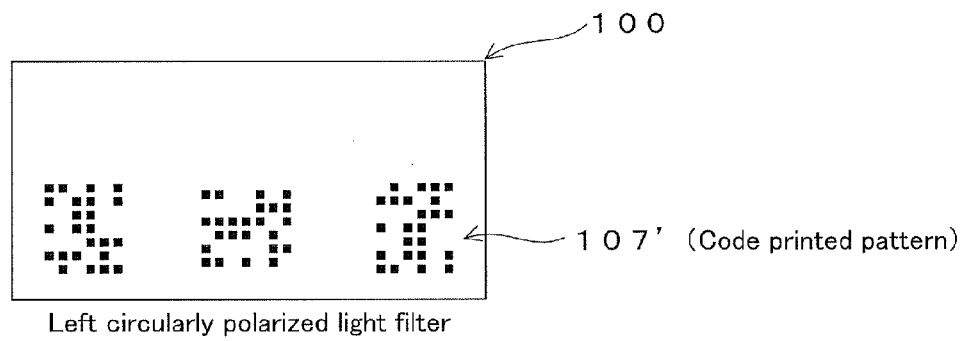
FIG. 3 is a conceptual diagram showing difference in appearance that can be seen in the identification medium of the embodiment.

The case in which the identification medium 100 is observed through the left circularly polarized light filter 110 (circularly polarized light filter which selectively penetrates counterclockwise turning circularly polarized light) is explained. In this case, the right circularly polarized light reflected from the cholesteric liquid crystal layer 102 is cut off by the left circularly polarized light filter 110. On the other hand, the reflected light from the code printed pattern 107 which changes to left circularly polarized light when it exits to an observing surface of the cholesteric liquid crystal layer 102 passes through the left circularly polarized light filter 110. Therefore, observed light 112 does not contain a hologram image of the cholesteric liquid crystal layer 102, but it contains image of the two-dimensional barcode of the code printed pattern 107. That is, in the case in which the identification medium 100 is observed through the left circularly polarized light filter, a hologram image formed by the hologram processing 103 is not observed, but the image of the two-dimensional barcode of the code printed pattern 107 is observed. An example of this condition is shown in FIG. 3A. In FIG. 3A, a hologram image 103' (see FIG. 3B) formed by the hologram processing 103 is not observed, but image 107' of the two-dimensional barcode of the code printed pattern 107 is selectively observed.

(Observation through Right Circularly Polarizing Filter)

Figure 3B:
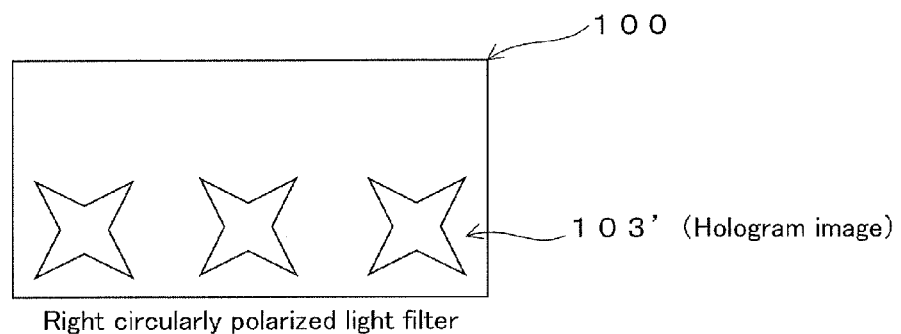

In the case in which the identification medium 100 is observed through the right circularly polarized light filter 111 (circularly polarized light filter which selectively penetrates clockwise turning circularly polarized light), the right circularly polarized light reflected from the cholesteric liquid crystal layer 102 passes through the right circularly polarized light filter 111, and therefore, observed light 113 contains a hologram image formed by the hologram processing 103. On the other hand, the reflected light from the code printed pattern 107 which changes to left circularly polarized light when it exits to an observing surface of the cholesteric liquid crystal layer 102 is cut off by the right circularly polarized light filter 111. Thus, the observed light 113 does not contain an image of the two-dimensional barcode of the code printed pattern 107. That is, in the case in which the identification medium 100 is observed through the right circularly polarized light filter, a hologram image formed by the hologram processing 103 is observed, but the image of the two-dimensional barcode of the code printed pattern 107 is not observed. An example of this condition is shown in FIG. 3B. In FIG. 3B, a hologram image 103' formed by the hologram processing 103 is selectively observed, but image 107' of the two-dimensional barcode of the code printed pattern 107 is not observed.

(Case in which Circularly Polarized Filter is Not Used)

Figure 3C:
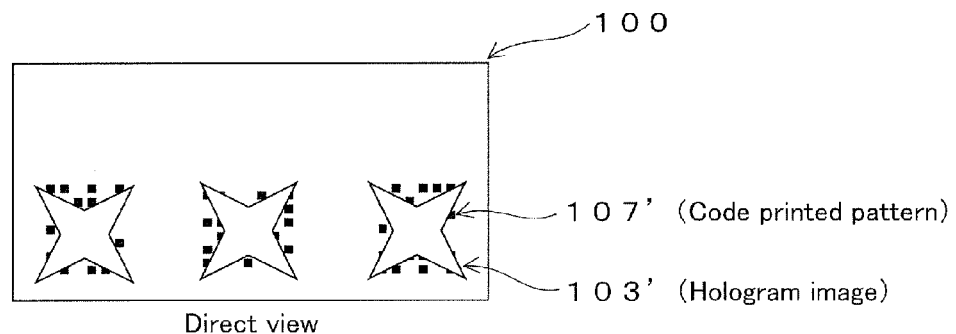

In the case in which right and left circularly polarized light filters are not used, a hologram image from the cholesteric liquid crystal layer 102 which is right circularly polarized light and an image of two-dimensional barcode from the code printed pattern 107 which is left circularly polarized light can be simultaneously observed from the identification medium 100. An example of this condition is shown in FIG. 3C. In FIG. 3C, a hologram image 103' formed by the hologram processing 103 and an image 107' of the two-dimensional barcode of the code printed pattern 107 are simultaneously observed. In this case, since the hologram image 103' is arranged at a near side from an observing surface, the image 107' of the two-dimensional barcode is masked at a part in which both images are overlapped, and it is difficult to recognize it. FIG. 3C shows this aspect exaggerated.

EXAMPLE OF APPLICATION

Figure 4A:
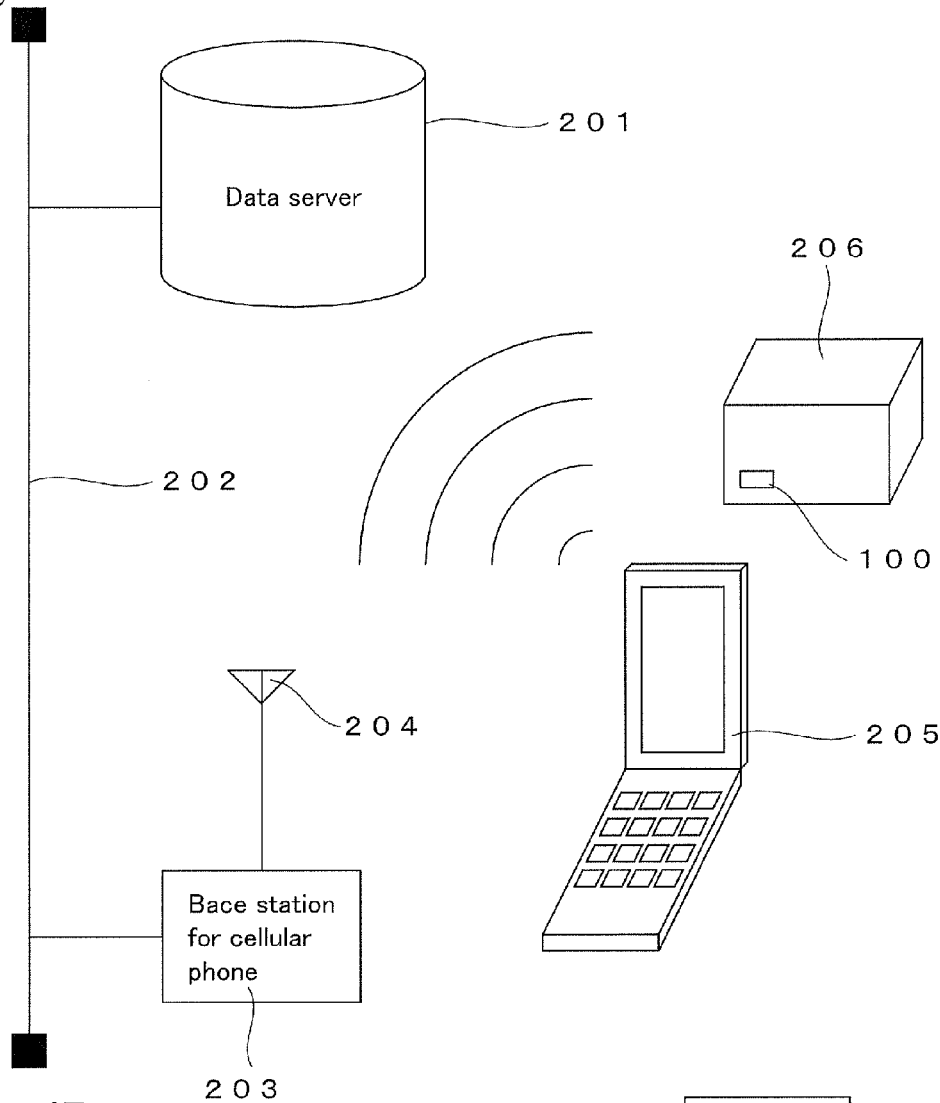
FIG. 4 is an example of system which identifies the identification medium of the embodiment.
Figure 4B:
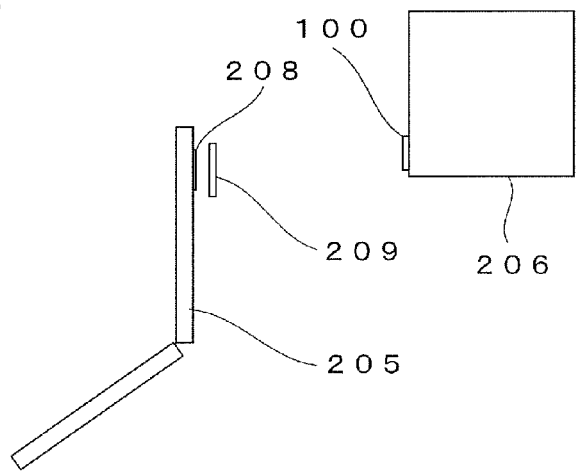

In the following, an example of application of the identification medium 100 will be explained. Here, an example of a two-dimensional barcode in which the identification medium 100 is adhered to articles is explained. FIG. 4 shows an example of identification system using the identification medium 100. FIG. 4A shows entire outline of the identification system and FIG. 4B shows an aspect which photographs the identification medium 100 by a cellular phone with camera.

A data server 201, an internet line 202, a base station for cellular phone 203, an antenna of a base station for a cellular phone 204, a cellular phone 205, a product 206, an identification medium 100, a camera 208, and a left circularly polarized light filter 209 are shown in FIG. 4. The data server 201 checks decoded information of two-dimensional barcode information of the identification medium 100. The internet line 202 is connected with the base station for cellular phone 203, and the base station for cellular phone 203 communicates with the cellular phone 205 via the antenna 204. The cellular phone 205 has the camera 208, and it has a function that decodes two-dimensional barcode information photographed by the camera 208 and which communicates with (sends data to) the data server 201 through the base station for cellular phone 203 via the internet line 202. The product 206 is various parts such as electronic parts, machine parts, etc., or products or product packages such as for foodstuffs, daily necessities, clothing, and application software for computers, etc. On the products 206, the identification medium 100 in which an authenticity decision function and predetermined content (for example, information for specifying manufacturer, historical information of distribution process, etc.) are encoded and printed, is adhered.

In an example shown in FIG. 4, a user photographs the identification medium 100 using a camera 208 in a cellular phone 205 through a left circularly polarized light filter 209. Data obtained by the camera 208 is transmitted to a data server 201 via a base station for cellular phone 203 and an internet line 202. The data server 201 checks code of the identification medium 100 with stored data to compare based on the transmitted data. Then, the data server 201 transmits specific information (for example, information for specifying manufacturer of products 206) to the cellular phone 205 based on content of the observed code. Inquiry is carried out by photographing the identification medium 100, decoding the image data, and transmitting the decoded data to the data server 201, as described above. Result (reply) of the inquiry is transmitted from the data server 201 to the cellular phone 205, and it is displayed on the cellular phone 205.

When the identification medium 100 is directly photographed without using the circularly polarized filter, hologram image of the cholesteric liquid crystal layer is also simultaneously photographed. Therefore, since the hologram image of the cholesteric liquid crystal is an obstacle to decoding, the image data cannot be decoded to a two-dimensional barcode (code printed pattern 107).

(Reading Apparatus)

Figure 5:
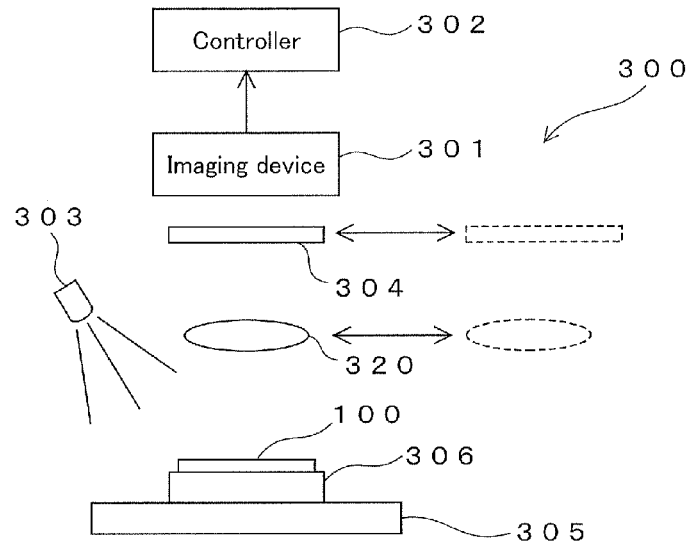
FIG. 5 is a conceptual diagram of the apparatus for optical reading.

FIG. 5 shows a reader 300 for reading the identification medium 100 shown in FIG. 1. The reader 300 includes an imaging device 301 such as a CCD, etc., a controller 302, a light 303, a circularly polarized light filter 304, a magnifying lens 320, and a stage 305. The imaging device carries out imaging of the identification medium 100. The controller 302 carries out operation control of the entire device, decoding and of code based on the image photographed by the imaging device 301, and authenticity decision. The light 303 irradiates white natural light to the identification medium 100. The circularly polarized light filter 304 is an optical filter (in this case, a left circularly polarized light filter) in which circularly polarized light (in this case, a right circularly polarized light) selectively reflected by the cholesteric liquid crystal layer 102 of the identification medium 100 is cut off. The circularly polarized light filter 304 is movable by a transferring means (not shown), so as to be able to be removed from an optical axis (front of the imaging device 301). The magnifying lens 320 is a magnifying optical system used for, for example, the case in which code which is difficult to recognize by the naked eye since it is too small, such as micro OCR code, etc., is used. The magnifying lens 320 is also removable from the optical axis. The stage 305 is a stage for loading an article (for example, electronic parts, various products, etc.) 306 to which the identification medium 100 is adhered.

Figure 6:
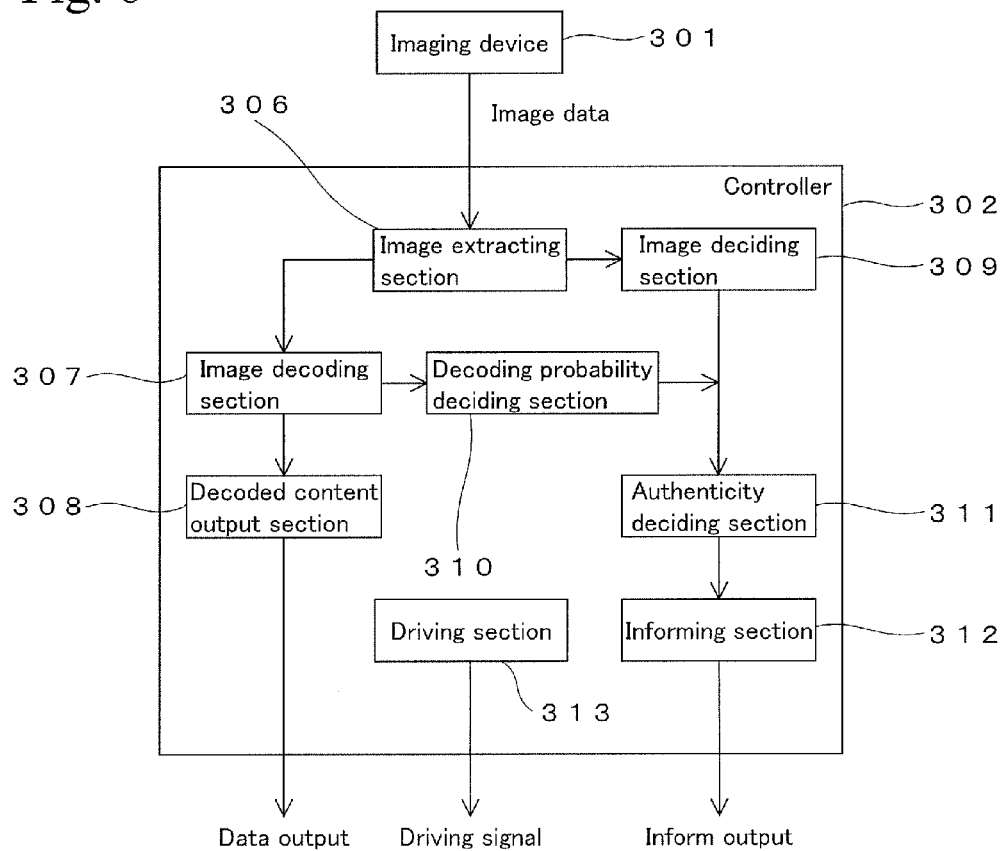
FIG. 6 is a block diagram of the apparatus for optical reading.

FIG. 6 is a block diagram showing a structure of the controller 302. The controller 302 functions as a computer which carries out a procedure in a flowchart, described below. The controller includes a CPU, a memory and an interface, and has the following functional sections constituted by software. The controller 302 contains an image extracting section 306, a decoding section 307, a decoded content output section 308, an image deciding section 309, a decoding probability deciding section 310, an authenticity deciding section 311, an informing section 312, and a driving section 313.

The image extracting section 306 extracts image content from image data. The decoding section 307 analyzes the extracted image, analyzes code (two-dimensional barcode data), and decodes it. The decoded content output section 308 outputs information of the decoded two-dimensional barcode. Here, as information of the two-dimensional barcode, specific information (for example, production number or various historical information) of an object 306 can be mentioned.

The image deciding section 309 decides whether the extracted image matches with previously stored images (reference images). The decoding probability deciding section 310 decides whether the decoding of the code data in the decoding section 307 is normally carried out. The authenticity deciding section 311 decides on the authenticity of the identification medium 100 based on the decision results in the image deciding section 309 and the decoding possibility deciding section 310. The informing section 312 outputs information signals for informing various decided results. The driving section 313 outputs driving signals for carrying out lighting control of the light 303 and moving control of the circularly polarized light filter 304 and the magnifying lens 320.

(Operation of Reader)

Figure 7:
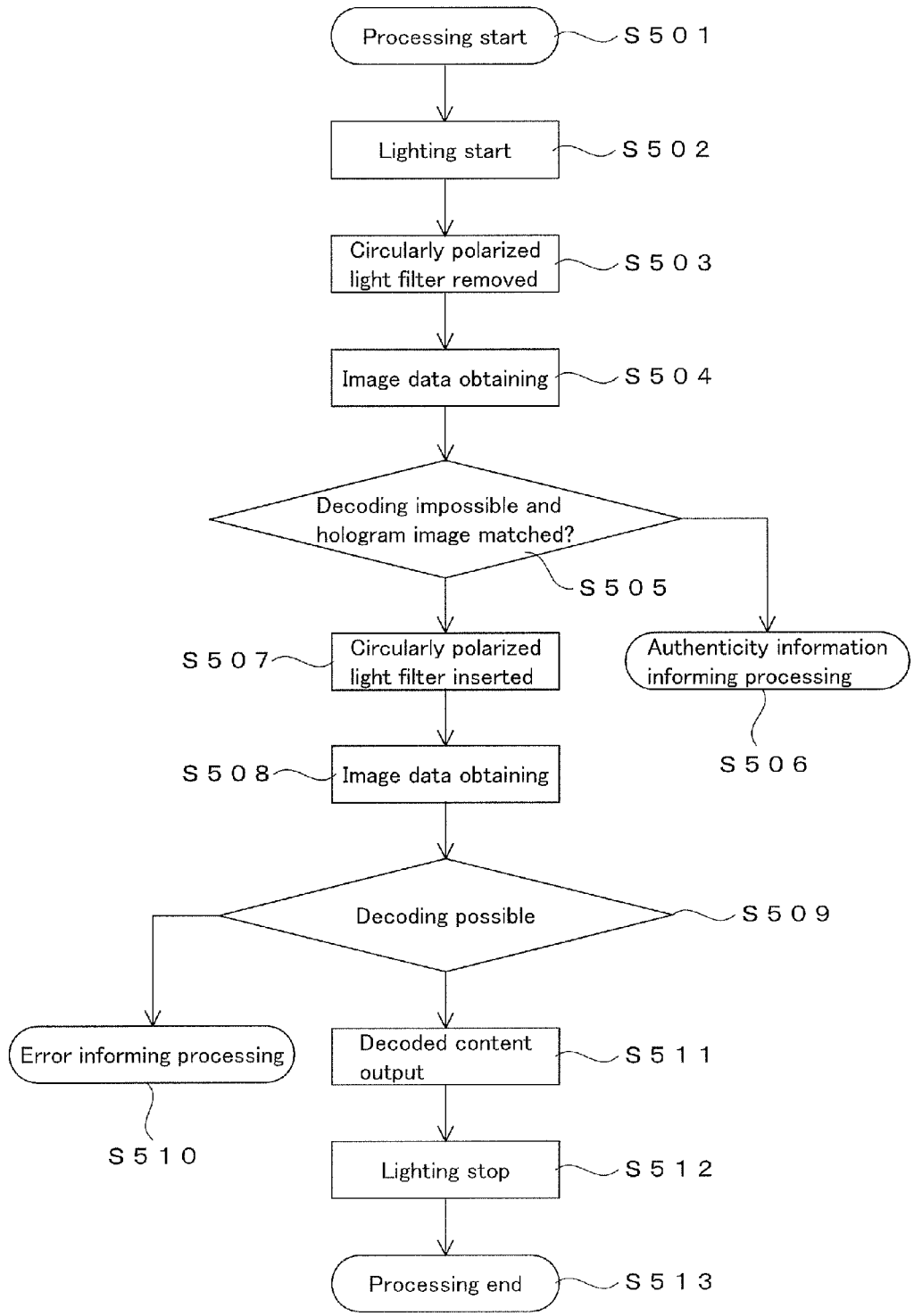
FIG. 7 is a flowchart diagram showing steps of actuating of the apparatus for optical reading.

FIG. 7 is a flowchart showing an example of operation of the reader 300. A program that carries out procedures of processing in FIG. 7 is stored in a suitable memory region in the controller 302, and it is carried out by the controller 302. This program may be an aspect that is stored in a suitable memory medium and is provided from there.

The processing is started in a condition in which the object 306 to which the identification medium 100 is adhered is loaded on the stage 305 in FIG. 5. When the processing is stared (Step S501), lighting of the light 303 is started (Step S502), and the circularly polarized light filter (left circularly polarized light filter) 304 is removed from a position between the imaging device 301 and the identification medium 100 (Step S503).

Next, the identification medium 100 is photographed from an observing surface side (side of the transparent protective layer 101) in FIG. 1 by the imaging device 301, and image data in which the identification medium 100 is photographed is obtained (Step S504). After the image data of the identification medium 100 is obtained, it is decided that two-dimensional barcode information cannot decoded and the obtained image matches (coincides) with reference images previously prepared (Step S505). When this deciding requirement is not satisfied, it is judged that an effect for obstructing the reading of the two-dimensional barcode due to the hologram image of the cholesteric liquid crystal layer 102 does not function normally and that there is high possibility that this hologram image is a counterfeit. As a result, information in which it is suspected to not be authentic (to be a counterfeit) is output (Step S506).

On the Step S505, in the case in which the two-dimensional barcode information cannot decoded and the obtained image matches with reference images previously prepared, the circularly polarized light filter 304 is inserted between the imaging device 301 and the identification medium 100 (Step S507), and image data is obtained by photographing the identification medium 100 again (Step S508). Next, this re-obtained image data is decoded, and it is decided whether the decoding is normal or not (Step S509). Here, when the decoding is not normal, an error processing is carried out (Step S510), and in contrast, when the decoding is normal, decoded content (two-dimensional barcode information of the identification medium 100) is output (Step S511). Then, lighting of the light 303 is stopped (Step S512), and the processing is finished (Step S513).

(Function of Authenticity Deciding)

First, as explained concerning to FIG. 2, in the case in which the identification medium 100 is viewed directly, two-dimensional barcode pattern and hologram image can be seen at the same time. In addition, the two-dimensional barcode alone is seen via the left circularly polarized light filter and the hologram image alone is seen via the right circularly polarized light filter. This switching between visible images makes possible to decide authenticity. A counterfeit product is difficult to be detected in the case in which detecting is performed by two-dimensional barcode alone; however, in the identification medium 100, the decision can be performed by the visual observation.

Furthermore, as explained concerning to FIGS. 5 and 6, detection of authenticity can also be performed by an electronic reading by an apparatus. That is, since the hologram processing 103 of the cholesteric liquid crystal layer 102 cannot be reconstructed well in a counterfeit product having similar appearance to the identification medium 100, decision at the step S505 becomes "NO". Furthermore, even in the case in which the decision of the step S505 is passed, decoding of the two-dimensional barcode cannot be performed and the product is regarded as an error, if the hologram image remains in the image data in the decision of the step S509. Therefore, a disadvantageous situation in which the two-dimensional barcode information of the counterfeit product is read as correct information, can be avoided.

In this way in the identification medium 100, counterfeit of two-dimensional barcode information can be easily detected by the both detections of authenticity by a visual observation and by an electronic reading.

(Other Matters)

The central wavelength (color) which the cholesteric liquid crystal layer 102 selectively reflects is not limited red, and another color such as green can be employed. Furthermore, the rotating direction of circularly polarized light that the cholesteric liquid crystal layer 102 selectively reflects is not limited the right rotating direction, and left rotating direction can be employed. For example, in the case in which rotating direction of circularly polarized light that the cholesteric liquid crystal layer 102 selectively reflects is determined as left rotating direction, the part of reference numeral 106 becomes a right circularly polarized filter layer.

A structure in which the base material film layer 108 and the adhering layer 109 are made transparent so that the adhered surface can be seen through, can be employed. In addition, the adhering layer can function as a light-absorbing layer by making color of the adhesive layer 109 a dark color. In this case, the hologram image may be emphasized and a two-dimensional barcode may become difficult to be seen by a direct vision. The pattern of the two-dimensional barcode can be formed by adhering thin films on which the pattern is preliminarily printed.

Variation Example 1

In the structure shown in FIG. 1, the circularly polarized light filter layer 106 can be omitted. In this case, in the observation via the right circularly polarized light filter, the code printed pattern can be also seen thin in addition to the hologram image. The case of the observation via the left circularly polarized light filter is similar to the case of the identification medium of FIG. 1. In the Variation Example 1, in an observation in which circularly polarized light filters are switched, switching between the two-dimensional barcode pattern and the hologram image is less obvious than that of identification medium of FIG. 1; however, it is possible to detect authenticity and to read information of a two-dimensional barcode by the process of FIG. 7.

Variation Example 2

As the code printed pattern 107, an OCR code in which micro characters having a size not recognizable by the naked eye (hereinafter referred to as micro OCR code) is used instead of the two-dimensional barcode image. The micro OCR code is one in which specific data is encoded (encrypted) by characters, has a size so that they are difficult to recognize by the naked eye, and is read using a lens. The method for using and characteristics of the identification medium in this case is similar to the case of the two-dimensional barcode except for a point that magnifying lens 320 is used and a point that the code system is changed, in the apparatus of FIG. 5.

In the case in which the micro OCR code is used, since it is difficult to read the code by the naked eye, the hologram image of the cholesteric liquid crystal layer is seen being emphasized, and thus identification property by the naked eye using a hologram image is increased. Furthermore, since the micro OCR code has small characters, in the case in which the micro OCR codes are tried to be read by image recognition not via the circularly polarized light filter, jamming action by the hologram image is great, and together with the point that the hologram image becomes a more clear image, detection of authenticity of the step S505 of FIG. 7 can be performed more effectively. It should be noted that a structure in which a smaller barcode figure is employed and is read by being magnified by an optical system may be employed.

Variation Example 3

An ID number can be used instead of the two-dimensional barcode. In this case, the ID number is recognized by image in the construction of FIGS. 5 and 6, and the specific information corresponding to the ID number (for example, production number, recognition number, specific name or the like) is decoded.

In this structure, in the case in which image recognition is performed in a condition the circularly polarized light filter 304 is removed, the ID number cannot be read because it is jammed by the hologram image of the cholesteric liquid crystal layer 102, and in the case in which image recognition is performed in a condition the left circularly polarized light filter is inserted in the optical path, the ID number can be read since the hologram disappears.

An optical function complicating reading of the ID number without using circularly polarized light filter using the hologram image of the cholesteric liquid crystal of which counterfeiting is difficult, a function accurately reading the ID number using the circularly polarized light filter without jammed by the hologram image, and a function of detecting counterfeits by image content of hologram images which is difficult to reconstruct can be provided, even in the case in which the ID number is known in some way to counterfeit an identification medium in this case.

Variation Example 4

As the hologram image formed by the hologram processing 103, one which includes hologram code can be employed.

In this case, by imaging via the right circularly polarized light filter, reading of the hologram code by the hologram processing 103 is performed. Then, by imaging via the left circularly polarized light filter, reading of the code of the code printed pattern 107 is performed. That is, by switching between the circularly polarized light filters, two codes can be selectively read.

In this case, the apparatus shown in FIG. 5 has the right circularly polarized light filter and the left circularly polarized light filter, and it can insert the right circularly polarized light filter on optical path and remove the filter from the path, and it can insert the left circularly polarized light filter in the optical path and remove the filter from the path. That is, in the case in which the right circularly polarized light filter is inserted in the optical path, the identification medium 100 is imaged via the right circularly polarized light filter, and the hologram code included in the hologram image formed by the hologram processing 103 is read. Furthermore, in the case in which the left circularly polarized light filter is inserted in the optical path, the identification medium 100 is imaged via the left circularly polarized light filter, the code of the code printed pattern 107 is read.

Furthermore in this case, detection of authenticity depending on combination of the circularly polarized light filter and content of code that is read, becomes possible. That is, detection of authenticity of the identification medium can be performed by detecting whether or not a content result decoded by applying right circularly polarized light filter and a content result decoded by applying right circularly polarized light filter are the same as a content which is preliminarily set.

This method can be also realized by the system shown in FIG. 4. In this case, circularly polarized light filters of left and right are prepared as the circularly polarized light filter arranged in front of the camera 208 of the cellular phone 205, a program which conducts the above method is prepared, and the program is executed at the code reading server 201.

(Method for Production)

An example of a method for production of the identification medium 100 of FIG. 1 is explained below. First, the cholesteric liquid crystal layer 102 is formed on a base plate for forming (not shown). After the cholesteric liquid crystal layer 102 is formed on the base plate for forming, a hologram mold is pressed thereon, to perform hologram processing 103. Next, the cholesteric liquid crystal layer 102 is separated from this base plate for forming, and the cholesteric liquid crystal layer 102 is fixed by heat pressing or adhesion, onto the circularly polarized light filter layer 106 which has been preliminarily joined by an adhesive. Furthermore, the transparent protective layer 101 is adhered onto an exposed side (observation side) of the cholesteric liquid crystal layer 102.

On the other hand, the base material film layer 108 is prepared, of which the adhesive layer 109 is arranged at the back side thereof and the code printed pattern 107 is printed on the front side thereof. By fixing them so that the code print layer 107 and the linearly polarized light filter layer 105 are cohered by heat pressing or adhesive, to obtain the identification medium 100 shown in FIG. 1.

By this method, the following operation becomes possible, that is, a primary material on which transparent protective layer 101, cholesteric liquid crystal layer 102 having hologram and circularly polarized light filter layer 106 are layered, and a secondary material on which adhering layer 109 and base material film layer 108 are layered are prepared; the primary material and the secondary material are joined so as to obtain the identification medium 100 after forming the code printed pattern 107; and this identification medium 100 is pasted on an objective. Therefore, in a production line, logistics line or the like, it becomes possible to operate forming the code on demand by printing and pasting this identification medium having printed code onto an objective. In this way, the identification medium of the present invention can be used in history management having a function of counterfeit proofing.

(2) Second Embodiment

Figure 8:
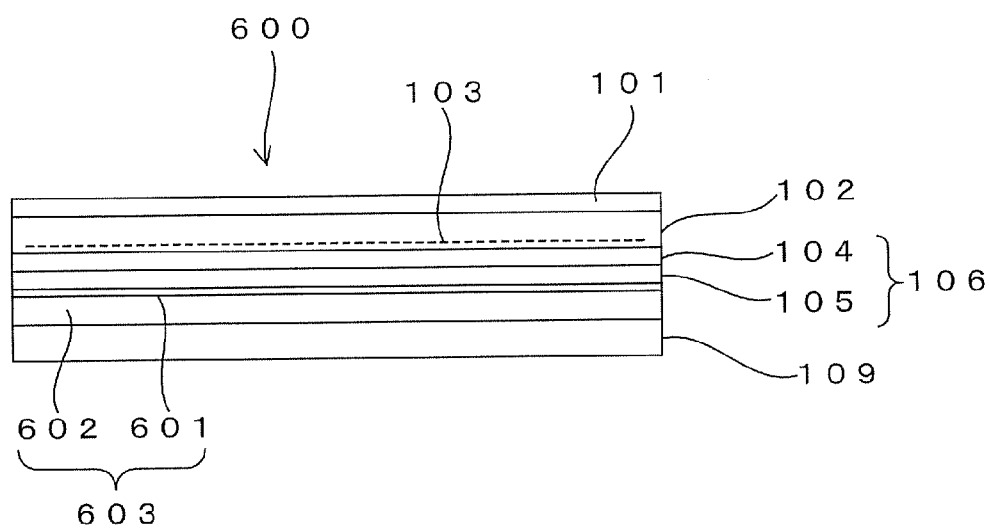
FIG. 8 is a conceptual diagram showing cross sectional structure of the identification medium of the embodiment.

FIG. 8 shows an identification medium 600 of an embodiment. Here, in FIG. 8, the same reference numerals as those in FIG. 1 are used, and the explanation of the same reference numerals is the same as that corresponding to FIG. 1. The identification medium 600 includes a metal reflective layer 601, an embossed layer 602, and a laminated hologram reflective layer 603 from an observing side on a non-observing surface of a circularly polarized light filter layer 106. The embossed layer 602 is a layer which is subjected to an embossing process for forming a hologram image on a resin film. The metal reflective layer 601 is a light reflective layer such as an aluminum deposited layer, and has an uneven surface corresponding to an uneven structure of the embossed layer 602 as an undercoating.

According to this structure, the hologram reflective layer 603 is formed by the metal reflective layer 601 and the embossed layer 602. The hologram image of the hologram reflective layer 603 contains hologram code in which specific data are represented (other patterns may be contained). Here, the hologram code may be made of a transferring foil, and may be an aspect which adheres it. As this technique, for example, techniques described in Japanese Unexamined Patent Application Publication No. H6(1994)-191525, can be used.

When code of the identification medium 600 is read in a reader 300 shown in FIG. 5, a hologram of the hologram processing 103 and a hologram of the hologram reflective layer 603 are simultaneously imaged in a condition in which a circularly polarized light filter 304 is removed from an optical axis. In this case, a hologram code of the hologram reflective layer 603 is masked by the hologram of the hologram processing 103, and it is difficult to selectively read the hologram code of the hologram reflective layer 603. When the identification medium 600 is imaged through the right circularly polarized light filter, the hologram of the hologram processing 103 is selectively imaged, and in contrast, when this identification medium 600 is imaged through the left circularly polarized light filter, the hologram of the hologram reflective layer 603 is selectively imaged. In this case, the code can also be read in the same manner as in the case of the first embodiment by imaging through the circularly polarized light filter.

Other Matters

A solvent inserting path is provided, so that solvent is easily penetrated (permeated) in an adhering layer 109 and a base film layer 108, and in addition, coloring materials colored by contacting a code pattern printing 107 or another undercoating with solvent, may be added. For example, color formers and color developers are encapsulated in microcapsules broken by contacting with solvent, and the microcapsules are added in the layer of code pattern printing 107. In this case, when adhesion function of the adhering layer 109 is decreased by using the solvent and in the case in which the identification medium 100 is attempted to be illegitimately peeled off from the object, the solvent is penetrated from the adhering layer 109 to the inside. As a result, the microcapsules break, and a coloring pattern is observed in addition to the code printed pattern 107. Thus, illegal reuse of the identification medium 100 peeled off using a solvent is prevented. As the above coloring technology by contacting with solvent, a technology described in Japanese Unexamined Patent Application Publication No. 2008-055813, can be used.

In the above structure that provides the solvent inserting path for easily penetrating the solvent to the adhering layer 109 and the base film layer 108, the code pattern printing 107 may be formed by ink containing dye that can be dissolved by the solvent. In this case, when the identification medium 100 is attempted to be peeled off from the object by the solvent, printing contents of the code pattern printing 107 are stained and code cannot be read. That is, illegitimate reuse of the identification medium 100 cannot be carried out. As this technique, a technique described in Japanese Unexamined Patent Application Publication No. H10(1998)-250228, can be used. As the above ink containing dye which can be dissolved by the solvent, dye consisting of 58 weight parts of pentaerythritol triacrylate, 29 weight parts of ethylene oxide modified bisphenol A diacrylate, 8 weight parts of organic solvent dissolvable dye, and 5 weight parts of 2,2-dimethoxy-2-phenylacetophenone, can be used.

(3) Third Embodiment (Structure)

Figure 9A:
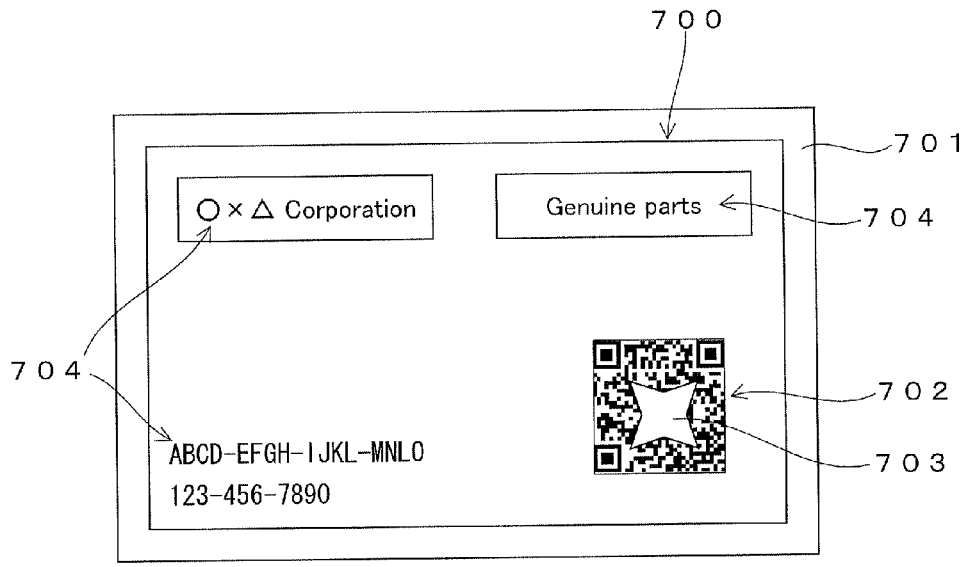
FIG. 9 is a front diagram (A), cross sectional diagram (B), and cross sectional diagram being separated condition (C), of the identification medium of the embodiment.

FIG. 9A shows a front of an identification medium 700 of an embodiment. The identification medium 700 is attached on a separator (peelable paper) 701. The identification medium 700 is used by being affixed to a mechanical part, an electrical part, or an article of other various products (or a package thereof), etc. The identification medium 700 includes a two-dimensional code figure 702 and a hologram figure 703 that is laminated on the two-dimensional code figure 702. The two-dimensional code figure 702 is, for example, a two-dimensional barcode, and includes coded information of various data relating to an article to which the identification medium is affixed, internet address by which details of the article can be obtained, and the like. In addition, the identification medium 700 includes other printed figures 704 that are formed by printing, for example, a product name, name of the manufacturer, a lot number, and other details.

Figure 9B:
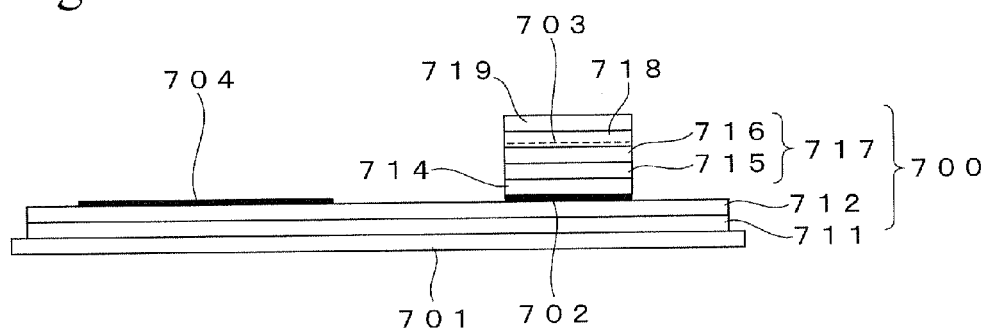

FIG. 9B shows a cross sectional structure of the identification medium 700 that is attached on the separator 701. The cross sectional structure of the identification medium 700 will be described below. The identification medium 700 has a base paper 712 as a base. The base paper 712 has a lower surface on the lower side in figure, which is provided with an adhesive layer 711 made of adhesive material. In order to affix the identification medium 700 to an article, the separator 701 is peeled off from the adhesive layer 711, and the exposed adhesive layer 711 is contacted with the article. As a result, the identification medium 700 is affixed to the article.

The base paper 712 has an upper surface (on the upper side in figure) opposite to the side provided with the adhesive layer 711. This upper surface is provided with ink layers of the two-dimensional code figure 702 and the other printed figure 704 by printing. An optically transparent adhesive layer 714 is provided on the two-dimensional code figure 702, and a circularly polarized light filter layer 717 is arranged thereon. The circularly polarized light filter layer 717 is formed by laminating a linearly polarized light filter layer 715 and a λ/4 plate 716.

A cholesteric liquid crystal layer 718 is provided on the circularly polarized light filter layer 717. The cholesteric liquid crystal layer 718 is embossed for exhibiting the hologram figure 703. The cholesteric liquid crystal layer 718 is set so as to selectively reflect circularly polarized light in a first circling direction. The circularly polarized light filter layer 717 is set so as to penetrate circularly polarized light from the lower side to the upper side in figure. This penetrated circularly polarized light has a second circling direction that is reverse to the first circling direction. The hologram figure 703 is overlapped on the two-dimensional code figure 702. Moreover, a transparent protective layer 719 made of TAC film or the like is provided on the cholesteric liquid crystal layer 718.

(Optical Function)

In the following descriptions, it is assumed that the cholesteric liquid crystal layer 718 selectively reflects right circularly polarized light. In addition, it is assumed that left circularly polarized light is selectively penetrated through the circularly polarized light filter layer 717 from the lower side to the upper side in figure. In this case, when the identification medium 700 is directly viewed, the two-dimensional code FIG. 702, the hologram figure 703, and the other printed figure 704, are seen. In this case, the code of the two-dimensional code figure 702 cannot be read due to interference of the hologram figure 703.

When the identification medium 700 is observed through a left circularly polarized light filter, light reflected at the cholesteric liquid crystal layer 718 cannot be observed. On the other hand, left circularly polarized light contained in light reflected at the two-dimensional code figure 702 passes through the circularly polarized light filter layer 717 from the lower side to the upper side in figure. Furthermore, the penetrated left circularly polarized light also passes through the cholesteric liquid crystal layer 718 and the left circularly polarized light filter which is a viewer. Accordingly, in the observation through the left circularly polarized light filter, the two-dimensional code figure is selectively clearly viewed. Naturally, in this condition, the two-dimensional code figure 702 is optically readable by using a reading device.

When the identification medium 700 is observed through a right circularly polarized light filter, light reflected at the cholesteric liquid crystal layer 718 is selectively observed, and light reflected at the two-dimensional code figure 702 is not observed. The reason for this is because left circularly polarized light reflected at the two-dimensional code figure 702 is cut off by the right circularly polarized light filter which is a viewer. Moreover, in this condition, by tilting the identification medium 700 and changing the viewing angle, color shift of the cholesteric liquid crystal layer 718 is observed, and identifying function is obtained by the color change.

(Production Method)

Figure 9C:
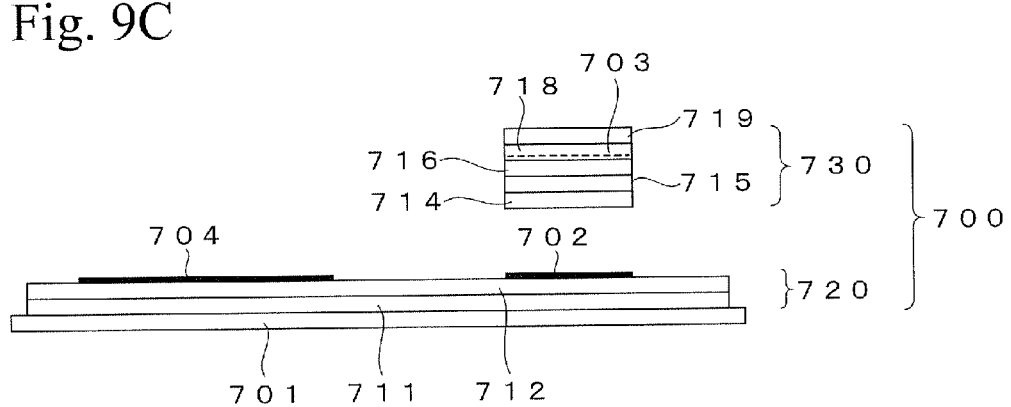

As shown in FIG. 9C, the identification medium 700 attached on the separator 701 is formed of a paper label portion 720 and a hologram label portion 730. In this structure, the paper label portion 720 and the hologram label portion 730 are formed separately and then combined by the adhesive function of the adhering layer 714, whereby the identification medium 700 is obtained.

Figure 10A:
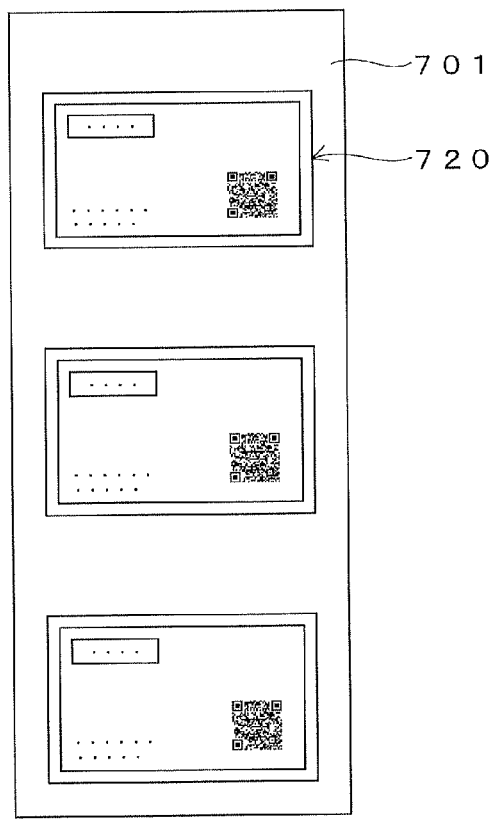
FIG. 10 is a front diagram (A) and side diagram (B) showing a condition in which multiple paper label parts constructing the identification medium of the embodiment are pasted on a separator.
Figure 10B:
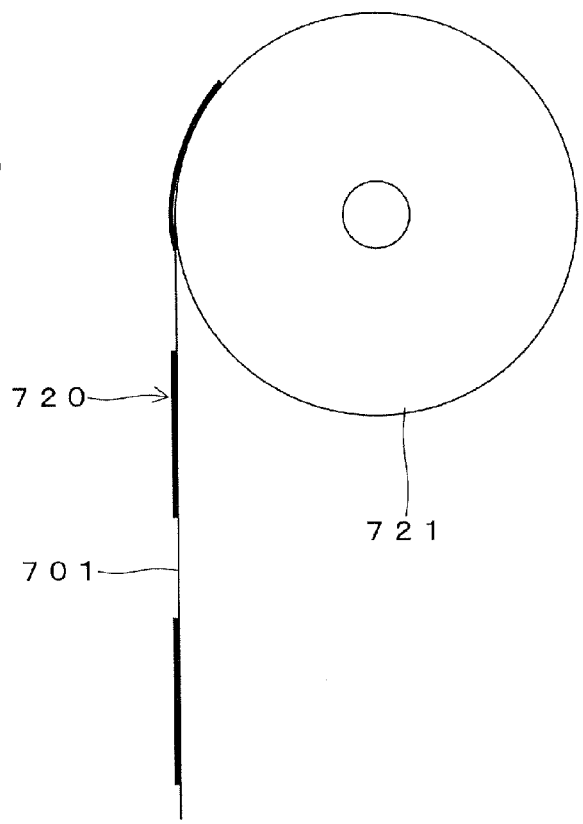
Figure 11A:
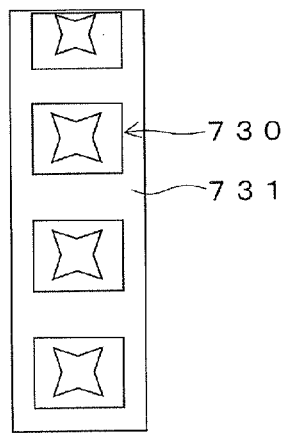
FIG. 11 is a front diagram (A) and side diagram (B) showing a condition in which multiple hologram label parts constructing the identification medium of the embodiment are pasted on a separator.
Figure 11B:
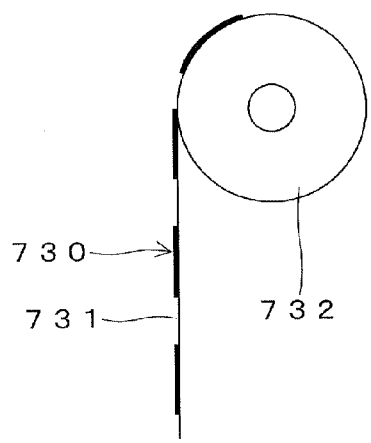

FIGS. 10A and 10B show a plurality of the paper label portions 720 that are attached on a ribbon separator 701 and are thereby formed into a tape shape. FIG. 10A shows a front of the paper label portions 720, and FIG. 10B is a side view of the paper label portions 720 that are rolled by a roll 721. FIGS. 11A and 11B show a plurality of the hologram label portions 730 that are attached on a ribbon separator 731 and are thereby formed into a tape shape. FIG. 11A shows a front of the hologram label portions 730, and FIG. 11B is a side view of the hologram label portions 730 that are rolled by a roll 732.

For example, the hologram label portion 730 is peeled off from the separator 731 and is adhered on the two-dimensional code FIG. 702 (see FIG. 9) of the paper label portion 720. Thus, the identification medium 700 attached on the separator 701 as shown in FIG. 9 is obtained.

(Apparatus for Production)

Figure 12:
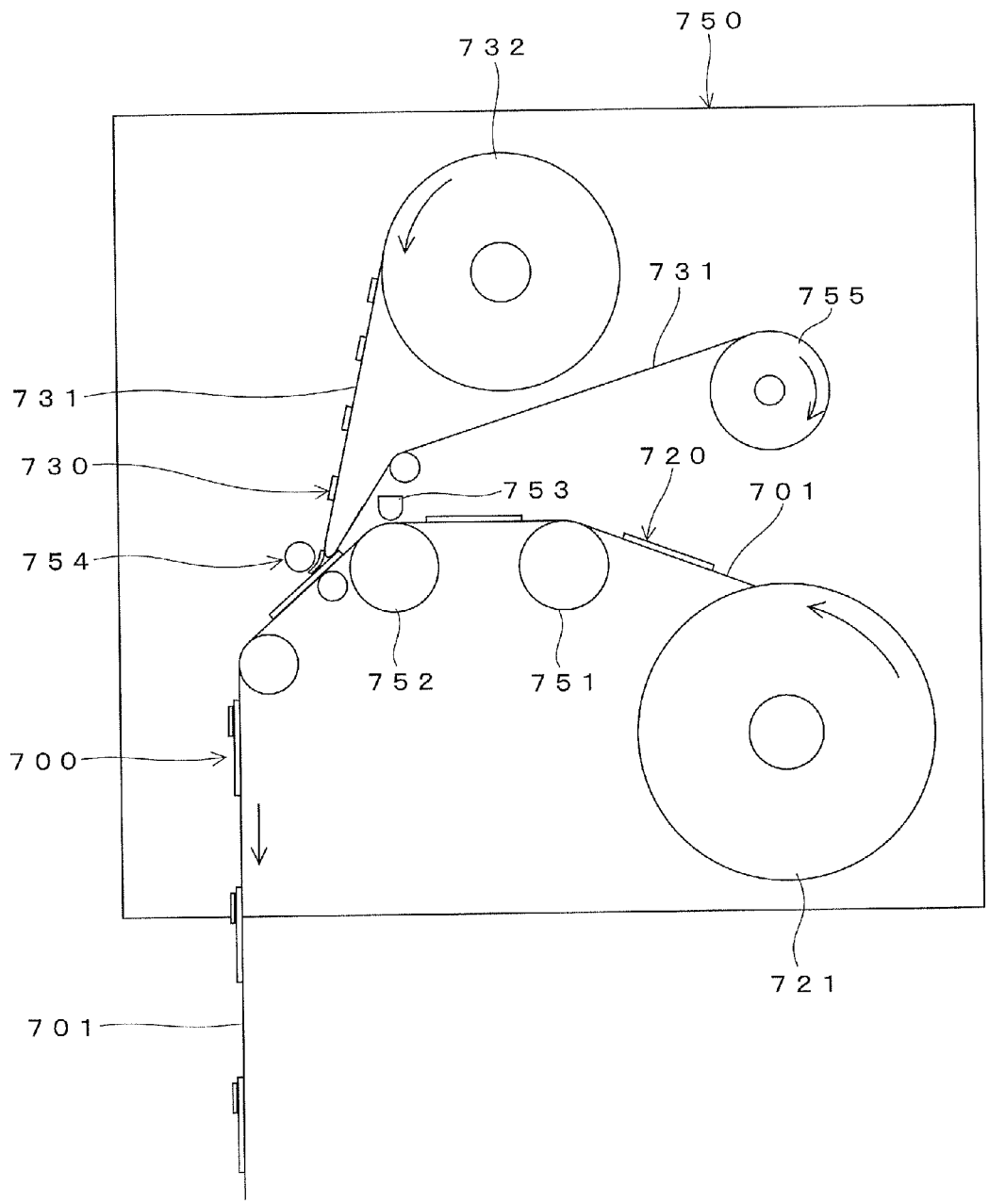
FIG. 12 is a conceptual diagram of the apparatus for production of an identification label of the embodiment.

FIG. 12 shows an example of an identification label production apparatus for producing identification labels in which the identification medium 700 is attached on the separator 701 as shown in FIG. 9. FIG. 12 shows an identification label production apparatus 750 that is mounted with the roll 721 in FIG. 10. The roll 721 rolls up the separator 701 on which the paper label portions 720 (see FIG. 9C) are attached. The separator 701 is provided with perforation and can be easily torn off later. The separator 701 on which the paper label portions 720 are attached is unrolled from the roll 721 and is sent to a guide roll 752 via a guide roll 751. A printing head 753 of a printing means is arranged so as to face the guide roll 752, whereby the paper label portions 720 can be printed. The printing head 753 can print a part or the entirety of the two-dimensional code FIG. 702 and the other printed figures 704 shown in FIG. 9. As the printing head 753, an ink-jet type may be used.

Moreover, the identification label production device 750 is mounted with the roll 732 in FIG. 11. The roll 732 rolls up the ribbon separator 731 on which the hologram label portions 730 (see FIG. 9C) are attached by the adhesive force of the adhering layer 714. While the separator 701 is unrolled from the roll 721, the separator 731 is synchronously unrolled from the roll 732.

After the separator 731 having the hologram label portions 730 is unrolled from the roll 732, the separator 731 is fed to an adhering roller 754, which is formed of a pair of rolls that face each other. The separator 731 is contacted with a surface of the paper label portion 720, which is printed with the two-dimensional code figure 702 and the other printed figures 704. In this case, as shown in FIG. 9C, the adhering layer 714 of the hologram label portion 730 contacts the portion of the two-dimensional code figure 702 of the paper label portion 720. In this condition, according to the pressure applied by the adhering roller 754, the hologram label potion 730 is securely adhered to the paper label portion 720. The separator 731 in FIG. 12 is not shown in FIG. 9C. This adhering is performed by the adhesive function of the adhering layer 714. In this case, the adhering layer 714 may be irradiated with heat or ultraviolet light according to the material thereof so as to facilitate adhering. After the hologram label portion 730 is adhered to the paper label portion 720, the separator 731 is rolled up by the winding roll 755.

Thus, by the adhering roller 754, the plurality of the identification media 700 shown in FIG. 9B are affixed to the separator 701 and are output to the outside of the identification label production device 750. The separator 701 is perforated so as to cut off each identification medium 700 with the separator 701. Therefore, an identification medium 700 in a label shape, which is adhered to the separator 701, is obtained by easy steps.

In the identification medium 700 shown in FIG. 12, while the paper label portion 720 is printed in real time by the printing head 753, the hologram label portion 730, which provides identifying ability when the printed figure is read, may be formed. This process may be performed in a producing scene or a distributing scene (for example, scene of packaging for shipping), of products to be identified. For example, in a facility for shipping products, information corresponding to each of various products that are customized with respect to customers may be printed as the two-dimensional code FIG. 702 by the printing head 753. Then, the hologram figure 703 for providing identifying ability may be formed thereon.

The present invention can be used for techniques for determining authenticity.

The invention claimed is:

1. An identification medium comprising, in order, seen from a side reading is performed:
   a cholesteric liquid crystal layer having a hologram image and in which circularly polarized light of primary rotating direction is selectively reflected;
   an optical function layer having a structure in which a λ/4 plate and a linearly polarized light filter layer are laminated in this order, from an observing side, and an optical function which selectively penetrates circularly polarized light of a secondary rotating direction opposite to the primary rotating direction in a direction toward the cholesteric liquid crystal layer when natural light enters from an opposite side to the cholesteric liquid crystal layer side; and
   a code forming layer in which an objective code that is to be read is formed, the cholesteric liquid crystal layer, the optical function layer and the code forming layer being disposed relative to each other such that a path of light is formed, the path of light extending through the cholesteric liquid crystal layer, the λ/4 plate, the linearly polarized light filter layer, and the code forming layer in this order such that the natural light initially passes through the cholesteric liquid crystal layer, then through the λ/4 plate, and then through the linearly polarized light filter layer to become linearly polarized light upon exiting the linearly polarized light filter layer in a direction away from the cholesteric liquid crystal layer, the linearly polarized light reflecting in the code forming layer and subsequently passing through the optical function layer in the direction toward the cholesteric liquid crystal layer to become the circularly polarized light of the secondary rotating direction upon exiting the optical function layer in the direction toward the cholesteric liquid crystal layer,
   the hologram image being disposed relative to the code so as to inhibit reading of information of the code while an optical reading device reads the code and the hologram image at the same time.

2. The identification medium according to claim 1, wherein the code is constructed by at least one selected from barcodes, two-dimensional codes, OCR codes, hologram codes, and color codes.

3. The identification medium according to claim 2, wherein the code has a size that makes it difficult to recognize by the naked eye.

4. The identification medium according to claim 1, wherein the hologram image constructs another code to the code formed in the code-forming layer.

5. An apparatus for identification, the apparatus deciding whether the identification medium according to claim 1 is authentic or counterfeit, wherein
   the apparatus comprises a reading means that selectively reads the code via the circularly polarized light filter that blocks the circularly polarized light of the primary rotating direction.

6. A method for production of the identification medium according to claim 1, the method comprising steps of:
   a forming process in which the code forming layer is formed by printing, and
   a unifying process in which the code-forming layer and the cholesteric liquid crystal layer are joined.

7. An apparatus for production of the identification medium according to claim 1, the apparatus comprising:
   a primary roll that rolls a primary separator on which a primary label part which can form a part or the entirety of the code-forming layer is pasted;
   a secondary roll that rolls a secondary separator on which a secondary label part including the cholesteric liquid crystal layer is pasted;
   a printing means that prints the code forming layer; and
   a pasting means that pastes the secondary label part on the code-forming layer printed by the printing means.

8. A method for reading data from an identification medium having
   a cholesteric liquid crystal layer with a hologram image and in which circularly polarized light of a primary rotating direction is selectively reflected,
   an optical function layer having a structure in which a λ/4 plate and a linearly polarized light filter layer are laminated in this order, from an observing side, and an optical function which selectively penetrates circularly polarized light of a secondary rotating direction opposite to the primary rotating direction in a direction toward the cholesteric liquid crystal layer when natural light enters from an opposite side to the cholesteric liquid crystal layer side, and
   a code forming layer in which an objective code which is to be read is formed, wherein the hologram image is disposed relative to the code so as to inhibit reading of information of the code while an optical reading device reads the code and the hologram image at the same time,
   the method for reading data comprising the step of:
   reading the code selectively by an optical reading device, via a circularly polarized light filter which blocks the circularly polarized light of the primary rotating direction, the cholesteric liquid crystal layer, the optical function layer and the code forming layer being disposed relative to each other such that, during the reading of the code, a path of light is formed, the path of light extending through the cholesteric liquid crystal layer, the λ/4 plate, the linearly polarized light filter layer, and the code forming layer in this order such that the natural light initially passes through the cholesteric liquid crystal layer, then through the λ/4 plate, and then through the linearly polarized light filter layer to become linearly polarized light upon exiting the linearly polarized light filter layer in a direction away from the cholesteric liquid crystal layer, the linearly polarized light reflecting in the code forming layer and subsequently passing through the optical function layer in the direction toward the cholesteric liquid crystal layer to become the circularly polarized light of the secondary rotating direction upon exiting the optical function layer in the direction toward the cholesteric liquid crystal layer.

9. The method for reading data according to claim 8, wherein
   the optical reading device reads the hologram in the cholesteric liquid crystal layer and the code simultaneously, and whether it is authentic or counterfeit is decided depending on selective reading of the code and simultaneous reading of the hologram and the code.

* * * * *